(12) United States Patent
Waghray et al.

(10) Patent No.: US 9,272,950 B2
(45) Date of Patent: Mar. 1, 2016

(54) COMPOSITE MATERIALS INCLUDING CERAMIC PARTICLES AND METHODS OF FORMING THE SAME

(71) Applicant: Honeywell International Inc., Morristown, NJ (US)

(72) Inventors: Akshay Waghray, Granger, IN (US); Richard Donaldson, Mishawaka, IN (US); Mark L. La Forest, Granger, IN (US)

(73) Assignee: Honeywell International Inc., Morris Plains, NJ (US)

( * ) Notice: Subject to any disclaimer, the term of this patent is extended or adjusted under 35 U.S.C. 154(b) by 120 days.

(21) Appl. No.: 14/132,915

(22) Filed: Dec. 18, 2013

(65) Prior Publication Data

US 2015/0166410 A1 Jun. 18, 2015

(51) Int. Cl.
*C04B 14/02* (2006.01)
*C04B 35/66* (2006.01)
(Continued)

(52) U.S. Cl.
CPC .............. *C04B 14/022* (2013.01); *C04B 35/56* (2013.01); *C04B 35/5622* (2013.01); *C04B 35/571* (2013.01); *C04B 35/573* (2013.01); *C04B 35/624* (2013.01); *C04B 35/66* (2013.01); *C04B 35/806* (2013.01); *C04B 35/83* (2013.01); *F16D 65/12* (2013.01); *F16D 69/023* (2013.01); *C04B 2235/00* (2013.01); *C04B 2235/3217* (2013.01); *C04B 2235/3232* (2013.01); *C04B 2235/3244* (2013.01); *C04B 2235/3251* (2013.01); *C04B 2235/3418* (2013.01); *C04B 2235/48* (2013.01); *C04B 2235/5248* (2013.01);
(Continued)

(58) Field of Classification Search
CPC ...... C04B 35/71; C04B 35/78; C04B 35/803; C04B 35/52; C04B 35/521
USPC .......... 264/641, 642, 29.1, 29.5, 29.7; 501/91, 501/95.2
See application file for complete search history.

(56) References Cited

U.S. PATENT DOCUMENTS 4,722,817 A * 2/1988 Nakano et al. ................ 264/29.5
4,892,790 A * 1/1990 Gray ............................. 428/548
(Continued)

FOREIGN PATENT DOCUMENTS

WO 2012063003 A1 5/2012

OTHER PUBLICATIONS

Huichao Chen, et al. "Nitrogen Doping Effects on the Physical and Chemical Properties of Mesoporous Carbons", J. Phys. Chem. C 2013, 117, 8318-8328, Published Apr. 1, 2013, dx.doi.org/10.1021/jp4017773.
(Continued)

*Primary Examiner* — Noah Wiese
(74) *Attorney, Agent, or Firm* — Shumaker & Sieffert, P.A.

(57) ABSTRACT

In some examples, a technique for forming a partially densified preform including ceramic particles may include mixing a densifying agent with metal oxide particles or metal oxide precursor to form a blended densifying agent, infiltrating the blended densifying agent in to a porous preform, pyrolyzing the infiltrated preform to convert the densifying agent to carbon and form a partially densified preform, and heat treating the partially densified preform to react at least some of the carbon with the metal oxide particles to form ceramic particles. Composite materials formed from porous preforms in which a blended densifying agent is disposed in pores of the preform are also described.

18 Claims, 7 Drawing Sheets

(51) Int. Cl.
| | |
|---|---|
| *C04B 35/56* | (2006.01) |
| *C04B 35/571* | (2006.01) |
| *C04B 35/573* | (2006.01) |
| *C04B 35/624* | (2006.01) |
| *C04B 35/80* | (2006.01) |
| *C04B 35/83* | (2006.01) |
| *F16D 65/12* | (2006.01) |
| *F16D 69/02* | (2006.01) |

(52) U.S. Cl.
CPC ............... *C04B 2235/5436* (2013.01); *C04B 2235/5445* (2013.01); *C04B 2235/612* (2013.01); *C04B 2235/614* (2013.01); *C04B 2235/616* (2013.01); *C04B 2235/6562* (2013.01); *F16D 2200/0047* (2013.01)

(56) References Cited

U.S. PATENT DOCUMENTS

| | | | |
|---|---|---|---|
| 5,380,556 A * | 1/1995 | Hocquellet | 427/228 |
| 6,376,431 B1 | 4/2002 | Matsumoto et al. | |
| 8,058,197 B2 * | 11/2011 | Ichikawa et al. | 501/91 |
| 8,268,393 B2 * | 9/2012 | Rollin et al. | 427/226 |
| 8,282,756 B2 | 10/2012 | Baud et al. | |
| 2003/0137815 A1 * | 7/2003 | Ochi et al. | 361/793 |
| 2005/0084717 A1 * | 4/2005 | Tani et al. | 428/698 |
| 2005/0221051 A1 | 10/2005 | Simpson et al. | |
| 2005/0271876 A1 | 12/2005 | Walker et al. | |
| 2007/0166546 A1 | 7/2007 | Ichikawa et al. | |
| 2008/0090064 A1 | 4/2008 | James et al. | |
| 2009/0148699 A1 | 6/2009 | Fryska et al. | |
| 2010/0291373 A1 | 11/2010 | Baud et al. | |

OTHER PUBLICATIONS

Jinwoo Lee, et al. "Synthesis of new nanoporous carbon materials using nanostructured silica materials as templates", RSC Publishing, J. Mater. Chem., 2004, 14, 478-486, Published Jan. 16, 2004. Retrieved from http://pubs.rsc.org/en/content/articlehtml/2004/jm/b311541k on Aug. 1, 2013.

Extended Search Report from counterpart European Application No. 14194164.1, dated Apr. 13, 2015, 10 pp.

Response to Rule 70(2) and 70a(2) EPC Communication dated Jun. 29, 2015, from counterpart European Application No. 14194164.1, filed Aug. 10, 2015, 19 pp.

* cited by examiner

COMPOSITE MATERIALS INCLUDING CERAMIC PARTICLES AND METHODS OF FORMING THE SAME

TECHNICAL FIELD

The present disclosure describes composite materials including ceramic particles and techniques for forming composite materials including ceramic particles from ceramic particle precursors.

BACKGROUND

Some composite bodies, such as some composite parts used in the aerospace industry, may be manufactured from porous preforms. The porous preforms may be densified using one of several processes, for example, chemical vapor deposition/chemical vapor infiltration (CVD/CVI), vacuum pressure infiltration (VPI), high pressure impregnation/carbonization (PIC), or resin transfer molding (RTM), which may introduce carbon into the porous preform.

SUMMARY

The present disclosure describes composite materials including ceramic particles and techniques for forming composite materials including ceramic particles from ceramic particle precursors. In some examples, a technique includes mixing a densifying agent with a ceramic particle precursor, for example, at least one of a metal oxide precursor or first metal oxide particles, to form a blended densifying agent. In some examples, the technique may include infiltrating the blended densifying agent into at least some of a plurality of pores of a porous preform to form an infiltrated preform. The blended densifying may be pyrolyzed to convert at least some of the densifying agent of the blended densifying agent to carbon and form a partially densified preform. The partially densified preform may further be heat treated to react at least some of the carbon with at least some of the first metal oxide particles or at least some second metal oxide particles derived from the metal oxide precursor and form a plurality of ceramic particles.

The densifying agent may include a carbon-bearing precursor, for example, at least one of a thermoplastic, thermoset phenolic, or furfuryl alcohol. In some examples, a thermoplastic densifying agent may include at least one of, for example, a synthetic pitch, a coal tar pitch, a petroleum pitch, a mesophase pitch, or an isotropic pitch. In some examples, mixing the densifying agent with the at least one of the metal oxide precursor or the first metal oxide particles includes mixing the densifying agent with at least one of a colloidal suspension including the first metal oxide particles, a sol-gel including metal oxides, a metal alkoxide, a metal-organic solution, or a metal salt. An example metal alkoxide that may be used as a metal oxide precursor includes tetraethylorthosilicate (TEOS). The first metal oxide particles or second metal oxide particles may include at least one of silicon dioxide, zirconium dioxide, aluminum oxide, titanium dioxide, hafnium oxide, or niobium dioxide.

In some examples, forming the blended densifying agent may reduce agglomeration of ceramic particle precursors or ceramic particles. By reducing agglomeration, the techniques described herein may facilitate substantially uniform dispersion of ceramic particles throughout a volume of the partially densified preform or composite material. In some examples, substantially uniform dispersion of the ceramic particles throughout a volume of the partially densified preform or composite material may contribute to desirable friction performance and wear characteristics for a carbon-carbon composite brake disc derived from the partially densified preform or composite material. Composite materials embodying such features can have a longer life span, require less maintenance, and/or lead to reduced costs, as compared to materials not including substantially uniformly dispersed ceramic particles.

In one example, the disclosure describes a method comprising mixing a densifying agent with at least one of a metal oxide precursor or first metal oxide particles to form a blended densifying agent, and infiltrating the blended densifying agent into at least some of a plurality of pores of a porous preform to form an infiltrated preform. In accordance with this example, the method further includes pyrolyzing the blended densifying agent to convert at least some of the densifying agent of the blended densifying agent to carbon and form a partially densified preform, and heat treating the partially densified preform to react at least some of the carbon with at least some of the first metal oxide particles or at least some second metal oxide particles derived from the metal oxide precursor to form a plurality of ceramic particles.

In another example, the disclosure describes an article comprising a porous preform including pores, and a blended densifying agent is disposed in at least some of the pores of the porous preform. The blended densifying agent may include at least a densifying agent (e.g., pitch) and at least one of a metal oxide precursor or first metal oxide particles.

The details of one or more examples are set forth in the accompanying drawings and the description below. Other features, objects, and advantages will be apparent from the description and drawings, and from the claims.

DETAILED DESCRIPTION

Figure 1:
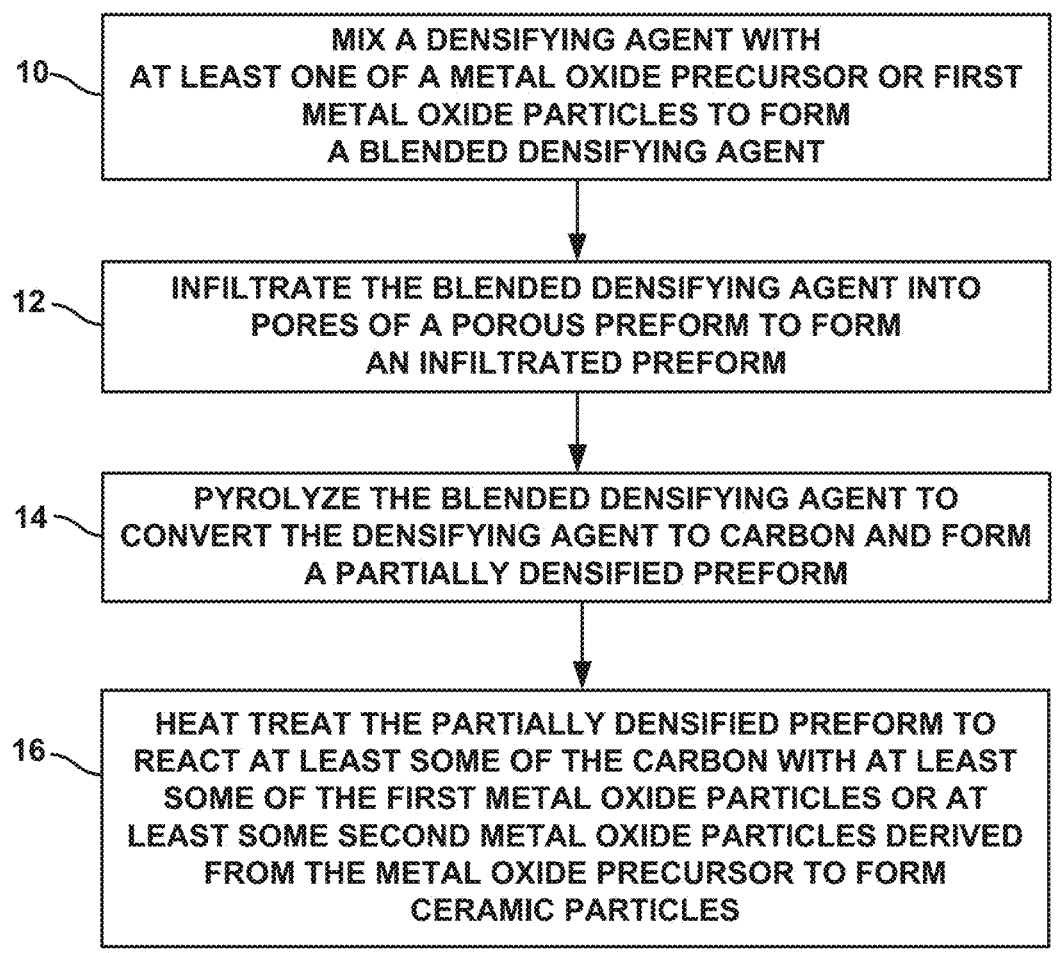
FIG. 1 is a flow diagram illustrating an example technique for forming a partially densified preform including a plurality of ceramic particles.

The present disclosure describes partially densified preforms that include ceramic particles and techniques for forming partially densified preforms that include ceramic particles. Articles derived from the preforms disclosed herein include, for example, carbon-carbon composite materials incorporating ceramic particles, such as carbon-carbon composite brake discs or engine components. In some examples, techniques described herein include mixing a densifying agent with a ceramic particle precursor, such as metal oxide particles or metal oxide particle precursors, to form a blended densifying agent. The densifying agent may include, for example, a carbon-bearing precursor, such as a thermoplastic (e.g., pitch), thermoset phenolic, furfuryl alcohol, or the like. In some examples, the metal oxide particle precursor may include a sol-gel including metal oxides and/or a metal alkoxide such as tetraethylorthosilicate (TEOS). Techniques described herein may include infiltrating the blended densifying agent into pores of a porous preform to form an infiltrated preform, then pyrolyzing at least some of the densifying agent to carbon to form a partially densified preform. Following pyrolyzation, the partially densified preform can be heat treated to react at least some of the carbon with at least some of the ceramic particle precursor to form ceramic particles. Ceramic particles dispersed throughout the partially densified preform may, in some examples, include nano-ceramic particles having sizes ranging from about 0.1 microns to about 10 microns.

In some examples, the disclosed techniques including mixing a viscous densifying agent with a ceramic particle precursor and infiltrating the blended densifying agent into a porous preform may yield partially densified preforms or composite materials having ceramic particles substantially uniformly dispersed therein (e.g., uniformly dispersed therein or nearly uniformly dispersed therein). In some examples, forming the blended densifying agent may reduce agglomeration of the ceramic particles or their precursors. By reducing agglomeration, the techniques described herein may facilitate substantially uniform dispersion of the ceramic particles throughout a volume of the partially densified preform or composite material. In some examples, substantially uniform dispersion of the ceramic particles throughout a volume of the partially densified preform or composite material may contribute to desirable friction performance and wear characteristics for a carbon-carbon composite brake disc derived from the partially densified preform or composite material. Additionally or alternatively, because the metal oxide particles react with carbon formed from pyrolyzing the densifying agent in which the metal oxide particles were mixed, fewer or substantially no metal oxide particles may react with carbon from the carbon fibers. This may reduce or substantially eliminate any effect on fiber strength due to reaction between metal oxide particles and carbon in the carbon fibers. In some examples, composite materials embodying these features can have a longer life span, require less maintenance, and/or lead to reduced costs, as compared to materials not including substantially uniformly dispersed ceramic particles.

Figure 2:
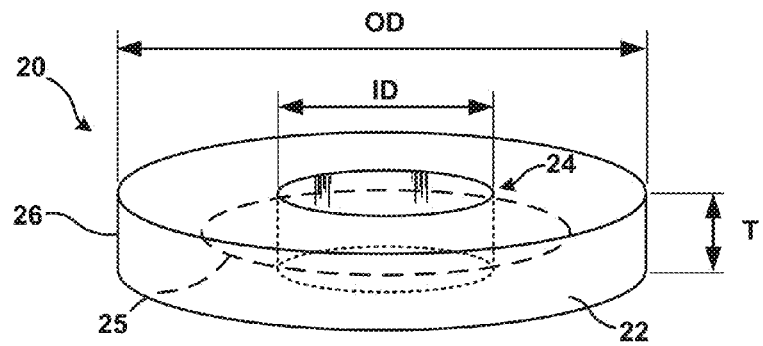
FIG. 2 is a perspective view of an example porous preform that may be infiltrated with a blended densifying agent.
Figure 3:
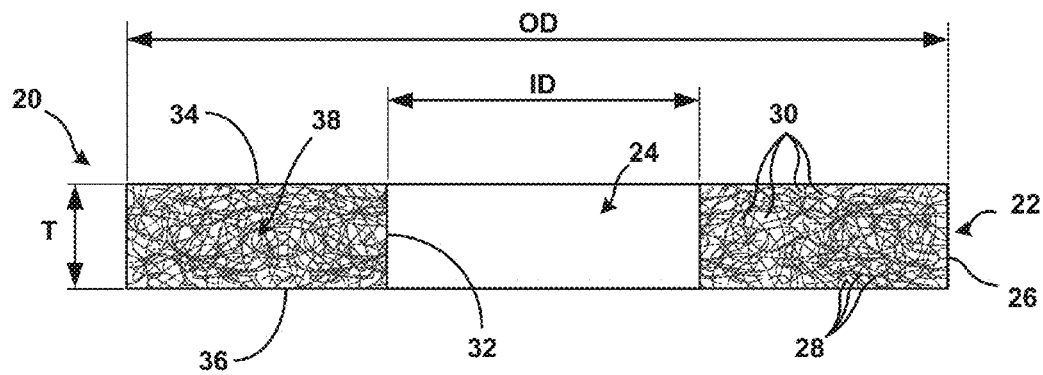
FIG. 3 is a lateral cross-sectional view of an example porous preform.
Figure 4:
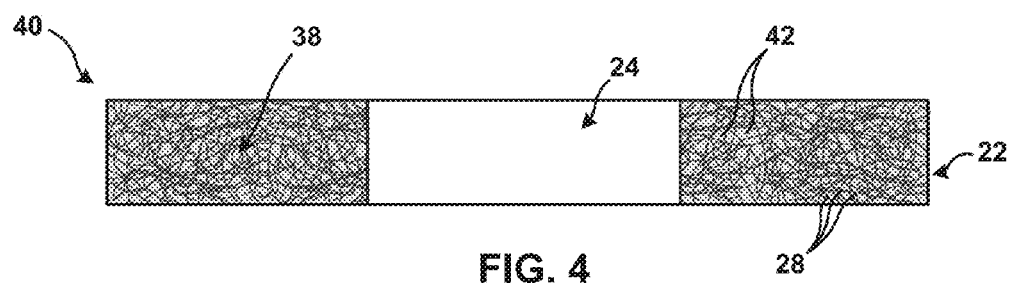
FIG. 4 is a lateral cross-sectional view of an example porous preform infiltrated with a blended densifying agent.
Figure 5:
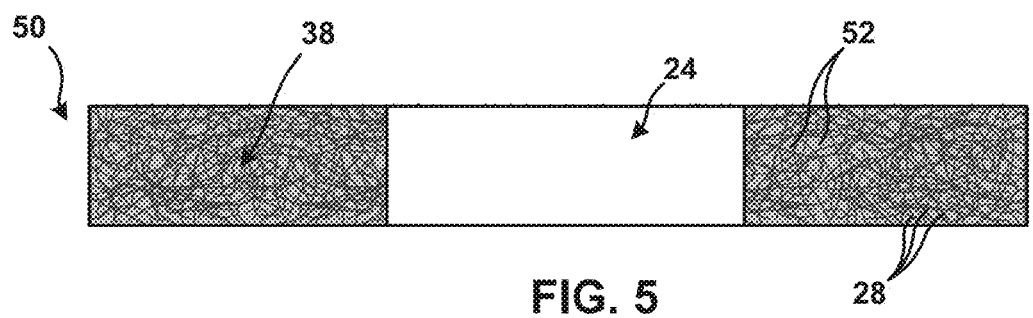
FIG. 5 is a lateral cross-sectional view of an example porous preform after pyrolyzation of a blended densifying agent to form a partially densified preform.
Figure 6:
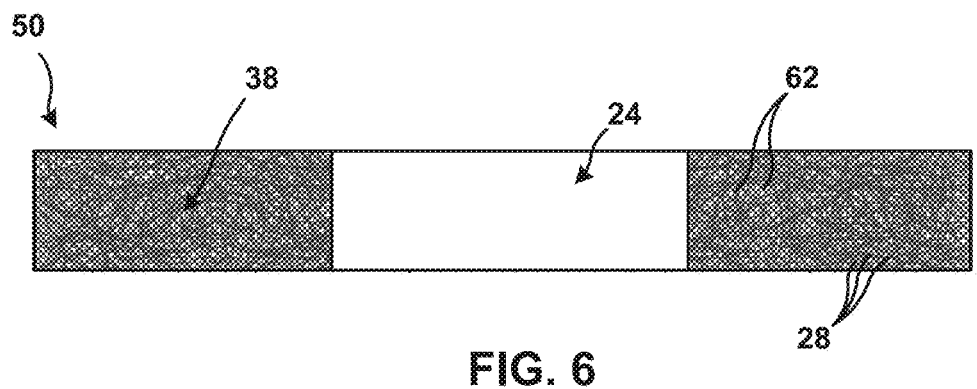
FIG. 6 is a lateral cross-sectional view of an example partially densified preform after heat treating to form a plurality of ceramic particles.

FIG. 1 is a flow diagram illustrating an example technique for forming a partially densified preform 50 including ceramic particles 62 (see FIG. 6). In some examples, partially densified preform 50 may subsequently be used to form a carbon-carbon composite material, such as a carbon-carbon composite brake disk or engine component. The technique of FIG. 1 will be described with reference to the conceptual diagrams of FIGS. 2-6, which show different views of an example porous preform 20, 40 at different steps during the technique of FIG. 1, and a partially densified preform 50 including ceramic particles 62 resulting from the technique of FIG. 1. Although an example porous preform 20 is depicted in FIGS. 2 and 3, the technique of FIG. 1 can be used with preforms of other types (e.g., other shapes and/or material compositions), and can be used to form partially densified preforms and composite materials having different shapes or material compositions.

The technique of FIG. 1 includes mixing a densifying agent with at least one of a metal oxide precursor or first metal oxide particles to form a blended densifying agent 42 (see FIG. 4) (10). The densifying agent may include, for example, a carbon-bearing precursor, such as a thermoplastic, thermoset phenolic, furfuryl alcohol, or the like. In some examples, a thermoplastic densifying agent may include, for example, at least one of coal tar pitch, synthetic pitch, petroleum pitch, mesophase pitch, and/or an isotropic pitch. In some examples, the densifying agent may have a viscosity between about 50 and about 500 centipoise (cp). For example, the viscosity of the densifying agent may be between about 50 cp and about 100 cp. In some examples in which first metal oxide particles are mixed with the densifying agent, the first metal oxide particles can include at least one of silicon dioxide particles, zirconium dioxide particles, aluminum oxide particles, titanium dioxide particles, hafnium oxide particles, or niobium dioxide particles. In some examples, the first metal oxide particles may be present in a colloidal suspension in a solvent. An example colloidal suspension of silicon dioxide particles in water is available under the trademark LUDOX® from Sigma-Aldrich® Co. LLC, Saint Louis, Mo. In some examples, the first metal oxide particles present in a colloidal suspension may be more than 90% miscible in the solvent. The solvent may also facilitate mixing of the first metal oxide particles with the densifying agent. Example solvents can include organic solvents that may be miscible with the densifying agent (e.g., thermoplastics, thermoset phenolics, or furfuryl alcohol), such as acetone, methyl ethyl ketone, diesel fuel, or alcohols. The solvent may, in some examples, subsequently be incinerated during pyrolyzing or removed by a vacuum recovery process.

In examples in which a metal oxide precursor is mixed with the densifying agent, the metal oxide precursor may include a sol-gel including a metal oxide precursor, a metal alkoxide, a metal-organic solution, or a metal salt. In some examples, metal alkoxides (such as tetraethylorthosilicate, or TEOS) may be used to form a sol-gel in a solvent that is miscible with the densifying agent (e.g., pitch). In some examples, a sol-gel of a metal alkoxide may be greater than 90% miscible in a solvent. For example, the solvent may include organic solvents that are miscible with thermoplastics (e.g., pitch), thermoset phenolics, or furfuryl alcohol, such as acetone, methyl ethyl ketone, diesel fuel, or alcohols. Again, the solvent may, in some examples, subsequently be incinerated during pyrolyzing or removed by a vacuum recovery process. In some examples, the sol-gel may include a polymer network with a loading of appropriate precursor elements, such as silicon, zirconium, titanium, aluminum, hafnium, niobium, or the like.

In some examples, the sol-gel may be formed by controlled hydrolysis of one or more metal alkoxides. This may be performed prior to mixing the sol-gel with the densifying agent, alone, or in combination with a solvent miscible with the sol-gel and densifying agent. In other examples, the controlled hydrolysis of the one or more metal alkoxides may be performed after mixing the metal alkoxides with the densifying agent. In either case, the sol-gel may be processed to form second metal oxide particles, such as silicon dioxide particles, zirconium dioxide particles, titanium dioxide particles, aluminum oxide particles, hafnium oxide particles, or niobium dioxide particles within the densifying agent.

The densifying agent and at least one of a metal oxide precursor or first metal oxide particles may be mixed to form blended densifying agent 42 by one or more of any number of techniques. For example, using a loss-in-weight feeder system, the densifying agent and the at least one of the metal oxide precursor or first metal oxide particles can be metered into a twin-screw extruder or melt blending system at desired concentrations or proportions. In some examples, a blended densifying agent 42 including substantially uniform dispersion (e.g., a uniform dispersion or nearly uniform dispersion) of the at least one of the metal oxide precursor or first metal oxide particles within the densifying agent may then be extruded into a melt accumulator.

The quantity of the at least one of the metal oxide precursor or first metal oxide particles can be determined, for example, based on a desired resultant weight of ceramic particles 62 in the final composite article. For example, in some instances, a final composite article may include between about 0.5 weight percent (wt. %) and about 3 wt. % ceramic particles 62. For example, a final composite article may include between about 0.5 wt. % and about 1 wt. % ceramic particles 62. The quantity of the at least one of the metal oxide precursor or first metal oxide particles also can be determined based on a desired resultant volume of ceramic particles 62 in the final composite article. For example, in some instances, a final composite article may include between about 0.1 volume percent (vol. %) and about 5 vol. % ceramic particles 62. The amount of the at least one of the metal oxide precursor or first metal oxide particles can be determined based on a predicted stoichiometric conversion relationship between the first metal oxide particles and the ceramic particles and/or between the metal oxide precursor and the ceramic particles.

In some examples, substantially all of ceramic particles 62 (e.g., all or nearly all of ceramic particles 62) may include particles with sizes ranging from about 0.1 microns to about 10 microns. For example, ceramic particles 62 may include particles with sizes below about 10 microns. In some examples, the particle size of the first metal oxide particles in blended densifying agent may be selected to provide ceramic particles 62 with the desired size range. In other examples, the metal oxide precursor and processing parameters according to which the metal oxide precursor is processed (such as hydrolysis conditions of a sol-gel) may be selected to result in ceramic particles 62 with the desired size range.

The technique of FIG. 1 further includes infiltrating blended densifying agent 42 into pores 30 of porous preform 20 (FIGS. 2 and 3) to form an infiltrated preform 40 (FIG. 4) (12). Porous preform 20 can include, for example, a woven fiber preform, a non-woven fiber preform, a chopped-fiber and binder preform, a binder-treated random fiber preform, a carbon fiber preform, a ceramic fiber preform, a foam preform, a porous carbon body preform, or a porous ceramic body preform. Porous preform 20 may define pores substantially throughout a volume of porous preform 20.

In some examples, porous preform 20 includes a plurality of mechanically bound layers, which can be, for example, a plurality of fibrous layers, such as a plurality of woven or nonwoven fabric layers, connected together, e.g., bound by a binder, such as a resin binder, or via needle-punching of the plurality of layers. Alternatively, porous preform 20 may not include predefined layers, but, rather, can be formed from a bundle of fibers that are mechanically bound together, e.g., via needling. In some examples, a combination of any of the aforementioned types of preforms can be used.

In some examples, as shown in FIG. 2, porous preform 20 may have a generally disc-shaped geometry so that a carbon-carbon composite material formed from porous preform 20 may be generally disc-shaped, e.g., for use as a brake disc. In other examples, porous preform 20 may define a different geometry. For example, the geometry of porous preform 20 may be similar to or substantially the same as the desired geometry for the finished part formed by the carbon-carbon composite material.

Porous preform 20 includes a disc-shaped porous body 22 with a central bore 24 extending through an axial thickness of disc-shaped porous body 22. In some examples, porous preform 20 has an inner diameter ID at bore 24, an outer diameter OD at an outer edge 26, and an axial thickness T, which is measured in a direction substantially orthogonal to the direction in which inner diameter ID and outer diameter OD are measured.

FIG. 3 is a conceptual diagram illustrating a lateral cross-sectional view of the example of porous preform 20 shown in FIG. 2, which is taken along a diameter of porous preform 20. Porous body 22 of porous preform 20 may include, for example, a plurality of fibers 28 that define a plurality of pores 30 within porous body 22. The porosity of porous body 22 extends substantially throughout the thickness T of porous body 22. As described above, in some examples, fibers 28 may be bound together by a binder, fibers 28 may be formed into a plurality of fibrous layers (not shown) that are bound or needle-punched together, or fibers 28 may be mechanically joined, e.g., using needle-punching, without previously being formed into distinct fibrous layers. Fibers 28 and pores 30 are not necessarily shown to scale, but rather are shown conceptually in order to illustrate aspects of the present disclosure.

As described above, the technique of FIG. 1 includes infiltrating blended densifying agent 42 into pores 30 of porous preform 20 to form an infiltrated preform 40 (12). In some examples, infiltration of blended densifying agent 42 into porous preform 20 (or a partially densified porous preform) may be accomplished by use of resin transfer molding or vacuum pressure infiltration. For example, in resin transfer molding, an accumulator containing blended densifying agent 42 can be discharged into a resin transfer mold containing porous preform 20. For example, a pre-heated, rigidized carbon-carbon aircraft brake disc may be placed into a resin transfer mold containing a press. The press may apply desired pressure to ensure the mold remains closed during the infiltration/injection cycle. In some examples, melt pressures used in the resin transfer molding process may be between 500 and 3,000 psi. More or less pressure may be used, depending on the porosity of porous preform 20. For example, relatively higher pressure may be used with a relatively more viscous blended densifying agent 42 and/or a relatively more dense (relatively less porous) porous preform 20, while relatively lower pressure may be used with a relatively less viscous blended densifying agent 42 and/or a relatively less dense (relatively more porous) porous preform 20.

In some examples, prior to infiltrating blended densifying agent 42 into pores 30 of porous preform 20 to form an infiltrated preform 40 (12) using a resin transfer molding technique, porous preform 20 may be rigidized with a densification cycle (e.g., CVD/CVI) and/or pre-heated at, for example, less than 450° C. for at least one hour. For instance, porous preform 20 may be pre-heated at a temperature between about 90° C. and about 450° C. for at least one hour, with the selected temperature in some examples being dependent on the composition of the densifying agent of the blended densifying agent 42 to be infiltrated. A CVD/CVI densification cycle may deposit a layer of carbon on surfaces of fibers 28, and may increase a mechanical strength of porous preform 20, such that porous preform 20 may be less likely to be damaged (e.g., delaminated) by the pressures used in the resin transfer molding technique.

In some examples, infiltrating blended densifying agent 42 into pores 30 of porous preform 20 to form an infiltrated preform 40 (12) may include using a vacuum pressure infiltration (VPI) technique. When using VPI, blended densifying agent 42 may be heated or melted and transferred to a VPI system including, for example, porous perform 20 under vacuum and temperature. Once porous preform 30 is loaded with the melted blended densifying agent 42, pressure can be applied (e.g., between about 40 psi and about 500 psi) by nitrogen or other inert gases. Porous preform 20 and blended densifying agent 42 may be held under pressure until pores 30 of porous preform 20 are substantially filled (e.g., filled or nearly filled), for example, for between about 2 and about 10 hours.

In some examples, regardless of whether RTM or VPI is used, infiltrating blended densifying agent 42 into porous preform 20 (12) may include infiltrating blended densifying agent 42 substantially throughout the entire preform body 22 so that an inner portion 38 of preform body 22 is substantially filled (e.g., filled or nearly filled) with blended densifying agent 42. The term "inner portion" may refer to a generally geometrically-centered region within preform body 22, wherein the inner portion has a volume that is a predetermined percentage of the total volume of porous preform 20, such as between about 15% and about 50% of the volume of porous preform 20, such as between about 20% and about 30% of the volume of porous preform 20.

As an example, for a generally annular preform, such as example porous preform 20 shown in FIG. 2, a geometric center of preform body 22 may generally be an annulus 25 (FIG. 2) that is generally axially centered within preform body 22, e.g., generally centered within thickness T, and that is generally radially centered within preform body 22, e.g., generally centered between inner diameter ID at inner edge 32 and outer diameter OD at outer edge 26. By way of example, an "inner portion" may be defined as a predetermined percentage of the radius of preform body 22 on either side of center annulus 25, such as at least about 50% of the radius (e.g., at least about 25% of the radius of center annulus 25 on either side of center annulus 25), for example at least about 30% of the radius (e.g., at least about 15% of the radius on either side of center annulus 25), such as at least about 20% of the radius (e.g., at least about 10% of the radius on either side of center annulus 25), for example at least about 15% of the radius (e.g., at least about 7.5% of the radius on either side of center annulus 25). In another example, preform body 22 includes a plurality of fibrous layers bonded, laminated, or needle-punched together, and inner portion 38 may include a predetermined number of inner layers of the plurality of layers on either side of a generally axially centered layer. In some examples, blended densifying agent 42 is infiltrated substantially throughout the entire porosity (e.g., substantially all of pores 30) of preform body 22.

The technique of FIG. 1 further includes pyrolyzing blended densifying agent 42, infiltrated in infiltrated preform 40, to convert at least some of the densifying agent (e.g., pitch) of blended densifying agent 42 to carbon 52 and form a partially densified preform 50 (14). During and after pyrolyzation, the at least one of the metal oxide precursor or the first metal oxide particles remains disposed in pores 30 along with carbon 52. To pyrolyze the densifying agent in blended densifying agent 42, infiltrated preform 40 including blended densifying agent 42 may be heated at a temperature of at least 650° C. for at least four hours of hold time to form partially densified preform 50. In some examples, raising the temperature of infiltrated preform 40 (or its surroundings during the heating process) to pyrolyze the densifying agent in blended densifying agent 42 includes increasing the temperature of infiltrated preform 40 (or its surroundings) at a rate of between about 1° C. per hour and about 20° C. per hour. The temperature at which infiltrated preform 40 is heated may depend upon, for example, the composition of the densifying agent of blended densifying agent 42. In some examples, infiltrated preform 40 including blended densifying agent 42 may be heated at a temperature between about 650° C. and about 800° C., for at least 4 hours of hold time, to form partially densified preform 50. Further, in some examples, heating infiltrated preform 40 including blended densifying agent 42 at a temperature within these ranges includes heating the infiltrated preform 40 including densifying agent 42 to the temperature at which it is being heated (i.e., in some examples, infiltrated preform 40 including densifying agent 42 may reach a substantially similar temperature as the temperature of its surroundings during the heating process). In some examples, pyrolyzation is performed under partial vacuum conditions or an inert atmosphere.

FIG. 5 is a lateral cross-sectional view of an example partially densified preform 50, after pyrolyzation of the densifying agent of blended densifying agent 42. As shown in FIG. 5, carbon 52 may be disposed in pores 30 (FIG. 3) in which blended densifying agent 42 was disposed prior to pyrolyzation. Hence, in some examples, carbon 52 may be disposed substantially throughout (e.g., throughout or nearly throughout) the volume of partially densified preform 50. In other examples, carbon 52 may be disposed at least partially throughout the volume of partially densified preform 50.

The technique of FIG. 1 also includes heat treating partially densified preform 50 to react at least some of carbon 52 with at least some first metal oxide particles or at least some second metal oxide particles derived from the metal oxide precursor to form a plurality of ceramic particles 62 (16). The first metal oxide particles may be those that previously had been mixed in blended densifying agent 42 or the second metal oxide particles may have been derived from the metal oxide precursor mixed in the blended densifying agent 42. Heat treating, as described herein, may include techniques such as vacuum heat treatment. In some examples, partially densified preform 50 is vacuum heat treated at a temperature between about 1200° C. and about 3000° C. for at least four hours, to react carbon 52 with the metal oxide to form ceramic particles 62. For example, partially densified preform 50 may be vacuum heat treated at a temperature between about 1600° C. and about 2000° C. for at least four hours.

As shown in FIG. 6, the technique of FIG. 1 may provide a substantially uniform dispersion (i.e., uniform or nearly uniform) of ceramic particles 62 throughout partially densified preform 50. Heat treating partially densified preform 50 (16), e.g., under inert conditions or vacuum may form nano-ceramic particles of carbides by reacting carbon 52 from the densifying agent. Because the first metal oxide particles react with carbon 52, which is formed from the pyrolyzing of the densifying agent in blended densifying agent 42, fewer or substantially no first metal oxide particles may react with carbon from plurality of fibers 28. This may reduce or substantially eliminate any effect on fiber strength due to reaction between first metal oxide particles and carbon in the plurality of fibers 28. In some examples, substantially uniform dispersion of ceramic particles 62 throughout a volume of partially densified preform 50 may contribute to desirable friction performance and wear characteristics for a carbon-carbon composite brake disc derived from partially densified preform 50. Composite materials embodying these features can have a longer life span, require less maintenance, and/or lead to reduced costs, as compared to materials not including substantially uniformly dispersed ceramic particles 62.

As noted, in some examples, substantially all of ceramic particles 62 (e.g., all or nearly all) may include particles with sizes ranging from about 0.1 microns to about 10 microns. For example, ceramic particles 62 may include particles with sizes below about 10 microns.

The ceramic particles may be any number of compounds, such as silicon carbide, zirconium carbide, zirconium silicon carbide, or aluminum carbide. In some examples, nanoparticle-sized hard ceramic additives to carbon-carbon brake composites, like those described in this disclosure, may improve friction performance, reduce wear, and improve oxidation protection of the carbon. Improved friction performance of aircraft brakes can help reduce the number of stages required in the brake, allowing for a smaller volume envelope, lighter weight brakes, a longer life span of brakes, and/or potential fuel savings. Brakes formed using the techniques of this disclosure may support, for example, a significant single aisle aircraft fleet.

Figure 7A:
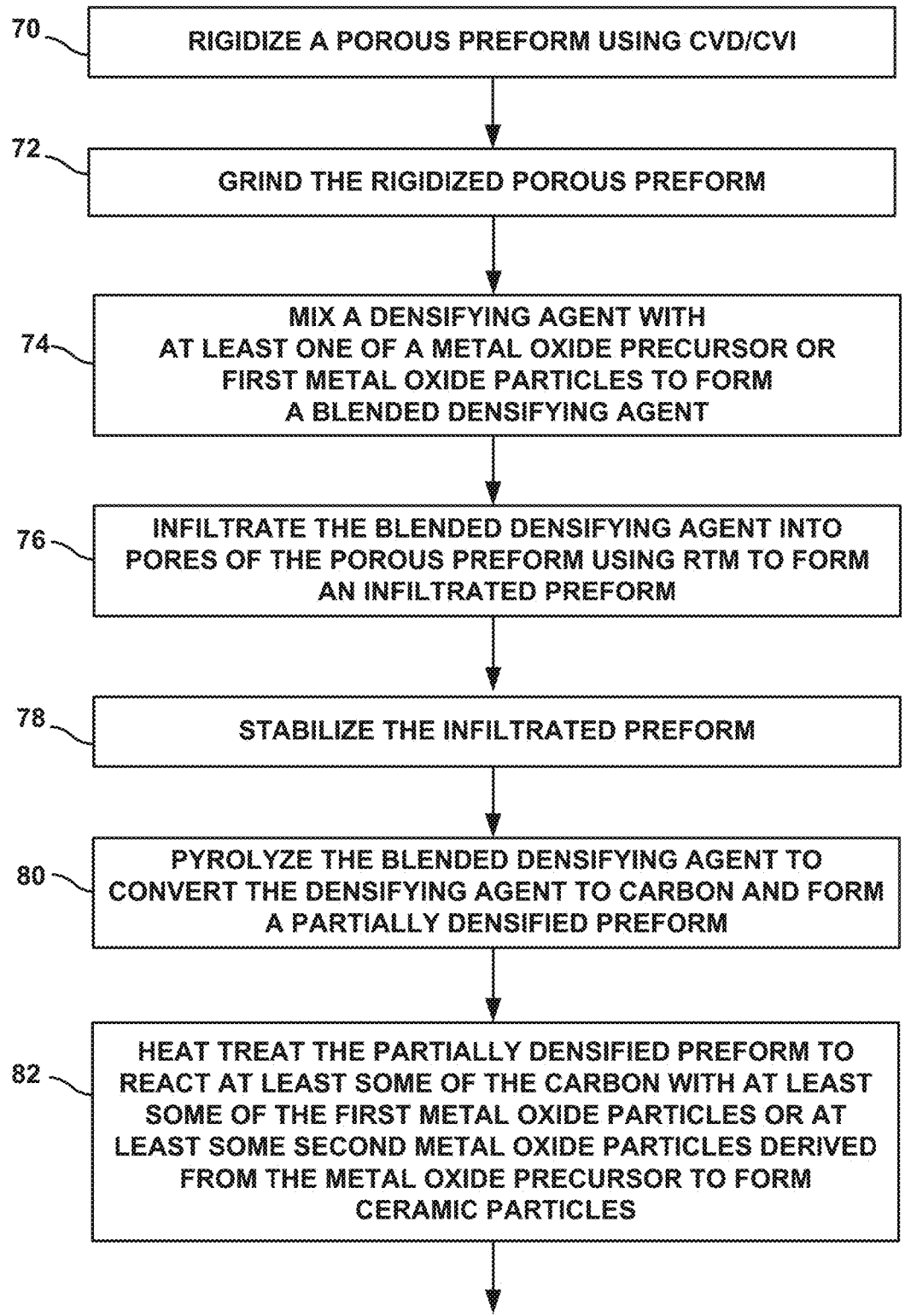
FIGS. 7A and 7B are two parts of a single flow diagram illustrating an example technique for forming a carbon-carbon composite body including a plurality of ceramic particles.
Figure 7B:
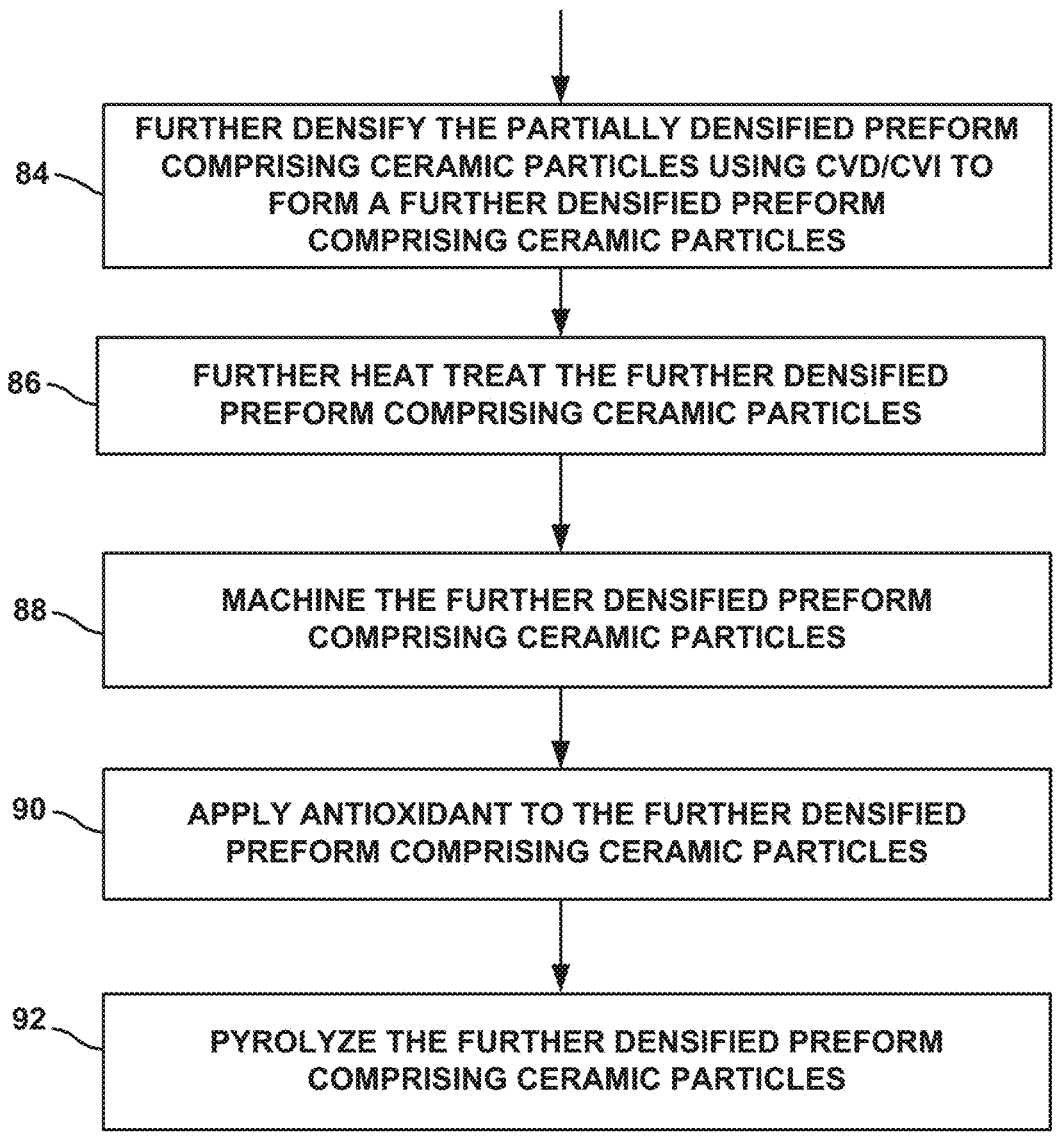

In some examples, techniques for forming carbon-carbon composite materials including ceramic particles may include at least one additional step compared to the steps shown in the technique of FIG. 1. For example, techniques for forming carbon-carbon composite materials including ceramic particles may include at least one additional densification step after forming partially densified preform 50 illustrated in FIG. 6. FIGS. 7A and 7B are two parts of a single flow diagram illustrating an example technique for forming a carbon-carbon composite body including a plurality of ceramic particles 62. The technique of FIGS. 7A and 7B will be described with reference to the conceptual diagrams of FIGS. 2-6, which show different views of an example porous preform 20, 40 at different steps during the technique of FIGS. 7A and 7B, and a partially densified preform 50 including ceramic particles 62. Although an example porous preform 20 is depicted in FIGS. 2 and 3, the technique of FIGS. 7A and 7B can be used with preforms of other types (e.g., other shapes and/or material compositions), and can be used to form partially densified preforms and composite materials having different shapes or material compositions.

The technique illustrated in FIGS. 7A and 7B may include, prior to infiltrating blended densifying agent 42 into pores 30 of porous preform 20 (76), rigidizing porous preform 20 using a densification cycle (e.g., CVD/CVI) (70) to form a rigidized porous preform including pores. Rigidizing porous preform 20 using CVD/CVI may deposit a layer of carbon on surface of plurality of fibers 28, which may improve mechanical stability and/or strength of the rigidized porous preform compared to porous preform 20. In some examples, the improved mechanical stability and/or strength of the rigidized porous preform may reduce or substantially eliminate damage to the ridized porous preform during subsequent processing (e.g., RTM) compared to a non-rigidized porous preform.

In some examples, the technique of FIGS. 7A and 7B further includes grinding the rigidized porous preform (72). In some examples, the rigidized porous preform may be grinded using mechanical means to ensure that the surface of the rigidized preform includes open porosity and/or to remove excess material and form a geometry that may be similar to or substantially the same as the desired geometry for a finished part formed by the carbon-carbon composite material (72).

The technique of FIGS. 7A and 7B also includes mixing a densifying agent with at least one of a metal oxide precursor or first metal oxide particles to form blended densifying agent 42 (74), in a manner similar to or the same as the mixing step described herein with respect to the technique of FIG. 1. Prior to, during, or after the preceding steps of the technique of FIG. 7A, mixing the densifying agent with the at least one of a metal oxide precursor or the first metal oxide particles to form blended densifying agent 42 (74) may be performed prior to, during, or after steps (70) and (72) of FIG. 7A.

The technique of FIGS. 7A and 7B may further include infiltrating blended densifying agent 42 into pores 30 of a rigidized porous preform 20 to form an rigidized infiltrated preform 40, using resin transfer molding (76), also as described above with respect to FIG. 1. In some examples, the technique of FIGS. 7A and 7B may optionally include stabilizing infiltrated preform 40 (78) by heating rigidized infiltrated preform 40 at a temperature between, for example, about 160° C. and about 180° C., in air, for about 10 to about 25 days. For instance, rigidized infiltrated preform 40 may be stabilized by heating rigidized infiltrated preform 40 at about 170° C. in air for between 10 and 25 days.

The technique of FIGS. 7A and 7B further includes pyrolyzing blended densifying agent 42, infiltrated in rigidized infiltrated preform 40, to convert at least some of the densifying agent of blended densifying agent 42 to carbon 52 and form a rigidized partially densified preform (80), in a manner similar to or the same as the pyrolyzing step described with respect to FIG. 1. The technique of FIGS. 7A and 7B further includes heat treating rigidized partially densified preform to react at least some of carbon 52 with at least some first metal oxide particles or at least some second metal oxide particles derived from the metal oxide precursor to form a plurality of ceramic particles 62 (82). As noted with respect to the technique of FIG. 1, the first metal oxide particles may be those that previously had been mixed in blended densifying agent 42 or the second metal oxide particles may have been derived from the metal oxide precursor mixed in blended densifying agent 42. In some examples, rigidized partially densified preform is vacuum heat treated at a temperature between about 1200° C. and about 3000° C. for at least for hours, to react carbon 52 with the metal oxide to form ceramic particles 62. For example, the rigidized partially densified preform may be vacuum heat treated at a temperature between about 1600° C. and about 2000° C. for at least four hours. In some examples, substantially all of ceramic particles 62 (e.g., all or nearly all) may include particles with sizes ranging from about 0.1 microns to about 10 microns. For example, ceramic particles 62 may include particles with sizes below about 10 microns. The ceramic particles produced by the technique of FIGS. 7A and 7B may include any number of compounds, such as silicon carbide, zirconium carbide, zirconium silicon carbide or aluminum carbide, depending upon the type of metal oxide particles or metal oxide precursor mixed in blended densifying agent 42.

The rigidized partially densified preform including ceramic particles 62 may optionally be further densified using CVD/CVI to form a further densified preform including ceramic particles (84). The technique of FIGS. 7A and 7B may also include further heat treating of the further densified preform including ceramic particles (86) at a temperature of between about 1200° C. and about 3000° C. for at least four hours. For example, the further densified preform may be vacuum heat treated at a temperature between about 1600° C. and about 2000° C. for at least four hours. Following the second heat treatment, the further densified preform including ceramic particles optionally may be machined, e.g., grinded, to form the desired geometry for a finished part and/or open porosity at surfaces of the further densified preform including ceramic particles (88). In some examples, the technique of FIGS. 7A and 7B includes applying antioxidant (e.g. an antioxidant solution) to the further densified preform (90), for example, following a second heat treatment and machining (if utilized). In some examples, the antioxidant may be a phosphate-based solution. An antioxidant solution may be applied by, for example, painting the antioxidant solution on the further densified preform in one or more coats. Finally, the technique of FIGS. 7A and 7B may also include pyrolyzing (or charring) the further densified preform including ceramic particles 62 (92) after application of the antioxidant, at, for example, a temperature between about 1200° C. and about 3000° C. for at least four hours. For example, the further densified preform including ceramic particles 62 may be heated at a temperature between about 1600° C. and about 2000° C. for at least four hours. The finished product of the technique of FIGS. 7A and 7B may include a carbon-carbon composite material including ceramic particles. In some examples, the technique of FIGS. 7A and 7B may produce a substantially uniform dispersion (i.e., uniform or nearly uniform) of ceramic particles throughout the carbon-carbon composite material including ceramic particles. In some examples, substantially uniform dispersion of ceramic particles 62 throughout a volume of the carbon-carbon composite material including ceramic particles may contribute to desirable friction performance and wear characteristics for a carbon-carbon composite material (e.g., a carbon-carbon composite brake disc) For example, in some examples, nanoparticle-sized hard ceramic additives to carbon-carbon composite materials, like those described in this disclosure, may improve friction performance, reduce wear, and improve oxidation protection of the carbon. Improved friction performance of aircraft brakes can help reduce the number of stages required in the brake, allowing for a smaller volume envelope, lighter weight brakes, a longer life span of brakes, and/or potential fuel savings. Brakes formed using the techniques of this disclosure may support, for example, a significant single aisle aircraft fleet.

Figure 8A:
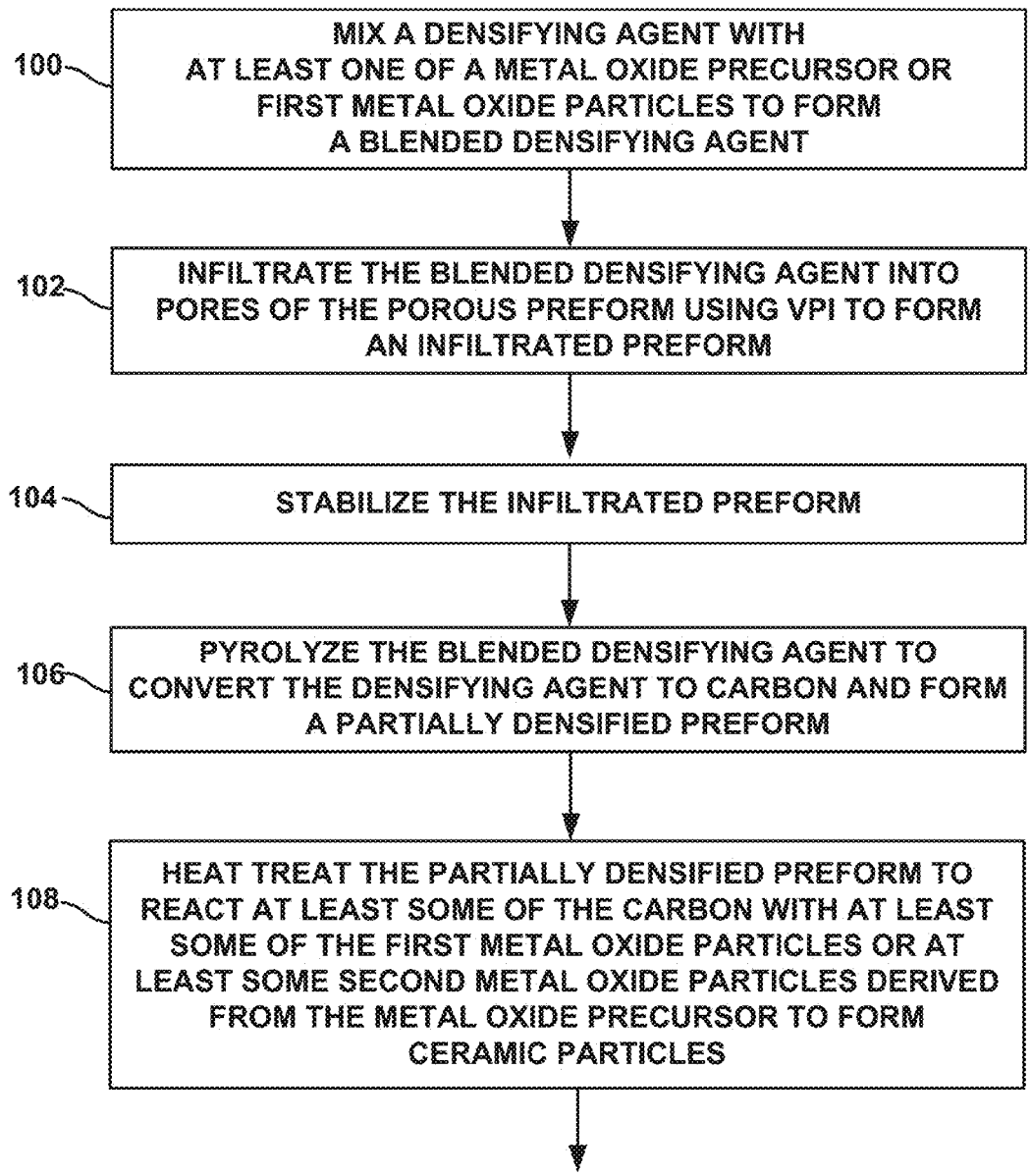
FIGS. 8A and 8B are two parts of a single flow diagram illustrating another example technique for forming a carbon-carbon composite body including a plurality of ceramic particles.
Figure 8B:
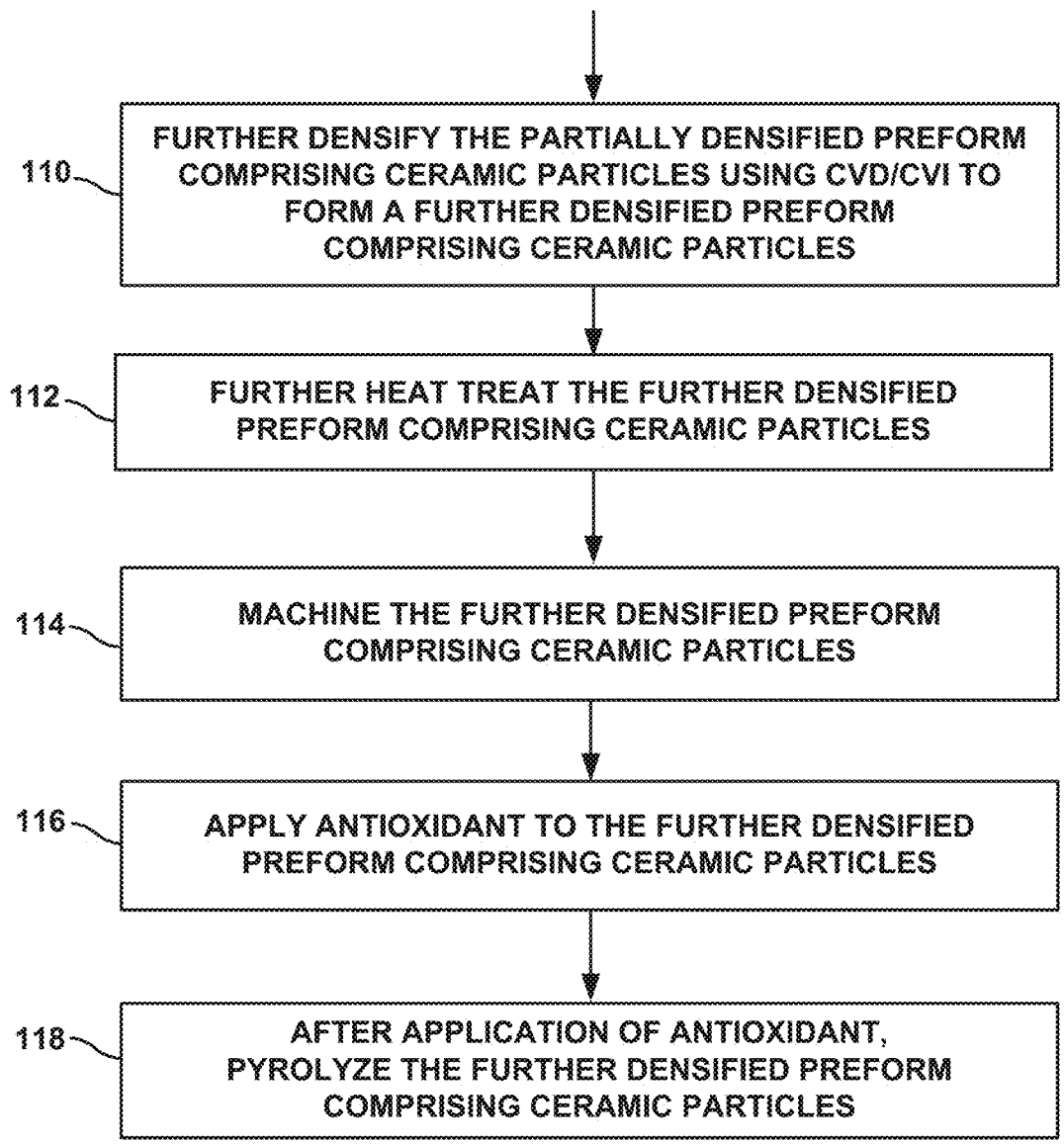

FIGS. 8A and 8B are two parts of a single flow chart illustrating another example technique for forming a carbon-carbon composite body including a plurality of ceramic particles 62. The technique of FIGS. 8A and 8B will be described with reference to the conceptual diagrams of FIGS. 2-6, which show different views of an example porous preform 20, 40 at different steps during the technique of FIGS. 8A and 8B, and a partially densified preform 50 including ceramic particles 62. Although an example porous preform 20 is depicted in FIGS. 2 and 3, the technique of FIGS. 8A and 8B can be used with preforms of other types (e.g., other shapes and/or material compositions), and can be used to form partially densified preforms and composite materials having different shapes or material compositions. Like the techniques of FIGS. 1 and 7A and 7B, the technique of FIGS. 8A and 8B includes mixing a densifying agent with at least one of a metal oxide precursor or first metal oxide particles to form blended densifying agent 42 (100). The disclosed technique further includes infiltrating blended densifying agent 42 into pores 30 of porous preform 20 (see FIGS. 2 and 3) using VPI to form infiltrated preform 40 (102). As described above, when using VPI, blended densifying agent 42 may be heated or melted and transferred to a VPI system including, for example, porous perform 20 under vacuum and temperature. Once loaded, pressure can be applied (for example, between about 40 and about 500 psi) by nitrogen or other inert gases. Porous preform 20 and blended densifying agent 42 may be held under pressure until pores 30 of porous preform 20 are substantially filled (e.g., filled or nearly filled), for example, between about 2 and about 10 hours.

Similar to the technique of FIGS. 7A and 7B, the technique of FIGS. 8A and 8B may optionally include stabilizing infiltrated preform 40 (104) by heating infiltrated preform 40 at a temperature between, for example, about 160° C. and about 180° C., in air, for about 10 to about 25 days. For instance, infiltrated preform 40 may be stabilized by heating infiltrated preform 40 at about 170° C. in air for between 10 and 25 days. The technique of FIGS. 8A and 8B further includes pyrolyzing blended densifying agent 42, infiltrated in infiltrated preform 40, to convert at least some of the densifying agent of blended densifying agent 42 to carbon 52 and form partially densified preform 50 (106), in a manner similar to or the same as the pyrolyzing step described with respect to the technique of FIG. 1. The technique of FIGS. 8A and 8B also may include heat treating partially densified preform 50 to react at least some of carbon 52 with at least some first metal oxide particles or at least some second metal oxide particles derived from the metal oxide precursor to form a plurality of ceramic particles 62 (108). As noted with respect to the above techniques, the first metal oxide particles may be those that previously had been mixed in blended densifying agent 42 or the second metal oxide particles may have been derived from the metal oxide precursor mixed in the blended densifying agent 42. In some examples, partially densified preform 50 is vacuum heat treated at a temperature between about 1200° C. and about 3000° C. for at least four hours. For example, partially densified preform 50 may be vacuum heat treated at a temperature between about 1600° C. and about 2000° C. for at least four hours, to react carbon 52 with the metal oxide to form ceramic particles 62, in sizes and having compositions as disclosed above.

Partially densified preform 50 including ceramic particles 62 may optionally be further densified using CVD/CVI to form a further densified preform including ceramic particles 62 (110). The technique of FIGS. 8A and 8B may also include further heat treating of the further densified preform composite body including ceramic particles 62 (112) at a temperature between about 1200° C. and about 3000° C. for at least four hours. For example, the further densified preform composite body including ceramic particles 62 may be vacuum heat treated at a temperature between about 1600° C. and about 2000° C. for at least four hours Following the second heat treatment, further densified preform including ceramic particles 62 optionally may be machined to form the desired geometry for a finished part and/or open porosity at the surfaces of the further densified preform including ceramic particles 62, as referenced herein (114). In some examples, the disclosed technique may include applying antioxidant (e.g., an antioxidant solution) to the further densified preform including ceramic particles 62 (116), for example, following a second heat treatment and machining (if utilized). In some examples, the antioxidant may be a phosphate-based solution. The antioxidant solution may be applied by, for example, painting the antioxidant solution on the further densified preform in one or more coats. Finally, the disclosed technique may also include pyrolyzing (or charring) the further densified preform including ceramic particles 62 (118) after application of the antioxidant, at, for example, a temperature of between about 1200° C. and about 3000° C. for at least four hours. For example, the further densified preform including ceramic particles 62, after application of the antioxidant, may be heated at a temperature between about 1600° C. and about 2000° C. for at least four hours. The finished product of the technique of FIGS. 8A and 8B may include a carbon-carbon composite material including ceramic particles. In some examples, the technique of FIGS. 8A and 8B may produce a substantially uniform dispersion (i.e., uniform or nearly uniform) of ceramic particles throughout the carbon-carbon composite material including ceramic particles. In some examples, substantially uniform dispersion of ceramic particles 62 throughout a volume of the carbon-carbon composite material including ceramic particles may contribute to desirable friction performance and wear characteristics for a carbon-carbon composite material (e.g., a carbon-carbon composite brake disc). For example, in some examples, nanoparticle-sized hard ceramic additives to carbon-carbon composite materials, like those described in this disclosure, may improve friction performance, reduce wear, and improve oxidation protection of the carbon. Improved friction performance of aircraft brakes can help reduce the number of stages required in the brake, allowing for a smaller volume envelope, lighter weight brakes, a longer life span of brakes, and/or potential fuel savings. Brakes formed using the techniques of this disclosure may support, for example, a significant single aisle aircraft fleet.

Various examples have been described. These and other examples are within the scope of the following claims.

The invention claimed is:

1. A method comprising:
    mixing a pitch with at least one of a sol-gel comprising a metal oxide, a metal alkoxide, a metal-organic solution, or a metal salt to form a blended densifying agent;
    infiltrating the blended densifying agent into at least some of a plurality of pores of a porous preform to form an infiltrated preform;
    pyrolyzing the blended densifying agent to convert at least some of the pitch of the blended densifying agent to carbon to form a partially densified preform; and
    heat treating the partially densified preform to react at least some of the carbon with at least some of the at least one of the sol-gel comprising the metal oxide, a metal oxide derived from the metal alkoxide, a metal oxide derived from the metal-organic solution, or a metal oxide derived from the metal salt to form a plurality of ceramic particles.

2. The method of claim 1, wherein the pitch comprises at least one of a synthetic pitch, a coal tar pitch, a petroleum pitch, a mesophase pitch, or an isotropic pitch.

3. The method of claim 1, wherein the metal alkoxide comprises tetraethylorthosilicate (TEOS).

4. The method of claim 1, wherein the sol-gel comprising the metal oxide comprises a plurality of particles of at least one of silicon dioxide, zirconium dioxide, aluminum oxide, titanium dioxide, hafnium oxide, or niobium dioxide.

5. A method comprising:
    mixing a pitch with at least one of a metal oxide precursor or first metal oxide particles to form a blended densifying agent;
    infiltrating the blended densifying agent into at least some of a plurality of pores of a porous preform to form an infiltrated preform, wherein infiltrating the blended densifying agent into at least some of the plurality of pores of the porous preform comprises using resin transfer molding;
    pyrolyzing the blended densifying agent to convert at least some of the pitch of the blended densifying agent to carbon and form a partially densified preform;
    heat treating the partially densified preform to react at least some of the carbon with at least some of the first metal oxide particles or at least some a second metal oxide particles derived from the metal oxide precursor to form a plurality of ceramic particles.

6. The method of claim 5, further comprising, prior to infiltrating the blended densifying agent into at least some of the plurality of pores of the porous preform using resin transfer molding, rigidizing the porous preform using at least one of chemical vapor deposition or chemical vapor infiltration.

7. The method of claim 1, wherein infiltrating the blended densifying agent into at least some of the plurality of pores of the porous preform comprises using vacuum pressure infiltration.

8. The method of claim 1, wherein heat treating the partially densified preform comprises heat treating the partially densified preform under vacuum.

9. The method of claim 5, wherein the first metal oxide particles comprise at least one of silicon carbide, zirconium carbide, aluminum carbide, titanium carbide, hafnium carbide, or niobium carbide.

10. The method of claim 1, further comprising forming a fully densified carbon-carbon composite material including the plurality of ceramic particles, wherein the fully densified carbon-carbon composite material comprises between about 0.1 volume percent (vol. %) and about 5 vol. % of the plurality of ceramic particles.

11. The method of claim 1, wherein substantially all of the ceramic particles of the plurality of ceramic particles have a particle size of between about 0.1 microns and about 10 microns.

12. The method of claim 1, wherein the porous preform comprises at least one of a woven fiber preform, a non-woven fiber preform, a chopped-fiber and binder preform, a binder-treated random fiber preform, a carbon fiber preform, a ceramic fiber preform, a foam preform, a porous carbon body preform, or a porous ceramic body preform.

13. The method of claim 1, further comprising, after heat treating the partially densified preform, further densifying the partially densified preform comprising the plurality of ceramic particles using at least one of chemical vapor deposition or chemical vapor infiltration.

14. The method of claim 13, further comprising, after further densifying the partially densified preform, heat treating the partially densified preform comprising the plurality of ceramic particles.

15. The method of claim 1, further comprising, after heat treating the partially densified preform, applying an antioxidant to the partially densified preform comprising the plurality of ceramic particles.

16. The method of claim 15, further comprising, after applying the antioxidant, pyrolyzing the partially densified preform comprising the plurality of ceramic particles.

17. An article comprising:
    a porous preform comprising pores; and
    a blended densifying agent disposed in at least some of the pores of the porous preform, wherein the blended densifying agent comprises at least one of a carbon-bearing precursor comprising at least one of a thermoplastic, thermoset phenolic, or furfuryl alcohol and at least one of a sol-gel comprising metal oxides, a metal alkoxide, a metal-organic solution, or a metal salt.

18. The article of claim 17, wherein the thermoplastic comprises at least one of a synthetic pitch, a coal tar pitch, a petroleum pitch, a mesophase pitch, or an isotropic pitch.

* * * * *